United States Patent
Lee et al.

(10) Patent No.: US 9,198,169 B2
(45) Date of Patent: Nov. 24, 2015

(54) METHOD AND DEVICE FOR A RELAY NODE TO TRANSMIT A SOUNDING REFERENCE SIGNAL TO A BASE STATION IN A WIRELESS COMMUNICATION SYSTEM

(75) Inventors: Seungmin Lee, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 164 days.

(21) Appl. No.: 13/992,661

(22) PCT Filed: Sep. 26, 2011

(86) PCT No.: PCT/KR2011/007062
§ 371 (c)(1),
(2), (4) Date: Jun. 7, 2013

(87) PCT Pub. No.: WO2012/081812
PCT Pub. Date: Jun. 21, 2012

(65) Prior Publication Data
US 2013/0250847 A1 Sep. 26, 2013

Related U.S. Application Data

(60) Provisional application No. 61/424,036, filed on Dec. 16, 2010.

(51) Int. Cl.
| | |
|---|---|
| H04L 5/00 | (2006.01) |
| H04B 7/155 | (2006.01) |
| H04W 72/04 | (2009.01) |
| H04L 27/26 | (2006.01) |

(52) U.S. Cl.
CPC ......... *H04W 72/0413* (2013.01); *H04L 5/0007* (2013.01); *H04L 5/0051* (2013.01); *H04L 27/2613* (2013.01); *H04B 7/15528* (2013.01); *H04L 5/0094* (2013.01)

(58) Field of Classification Search
CPC ...................................................... H04B 7/14
See application file for complete search history.

(56) References Cited

U.S. PATENT DOCUMENTS

| | | | | |
|---|---|---|---|---|
| 2010/0080139 | A1* | 4/2010 | Palanki et al. | 370/252 |
| 2010/0232285 | A1* | 9/2010 | Lee et al. | 370/210 |

(Continued)

FOREIGN PATENT DOCUMENTS

WO    WO 2010/140871 A2    12/2010

*Primary Examiner* — Noel Beharry
*Assistant Examiner* — Aung Oo
(74) *Attorney, Agent, or Firm* — Dentons US LLP

(57) ABSTRACT

The present invention relates to a method for a relay node (RN) to transmit a sounding reference signal (SRS) to a base station in a wireless communication system. The method for SRS transmission includes: receiving the backhaul downlink subframe setting information from the base station; allocating backhaul uplink subframes on the basis of the received backhaul downlink subframe setting information; receiving uplink subframe setting information; receiving uplink subframe setting information for SRS transmission from the base station; receiving an indicator for triggering the SRS transmission from the base station; and, if a first uplink subframe from among the uplink subframes for the SRS transmission is the backhaul uplink subframe, transmitting the SRS from the first uplink subframe to the base station; or, if the first uplink subframe is not the backhaul uplink subframe is not the backhaul uplink subframe, not transmitting the SRS to the base station; or transmitting the SRS from a second uplink subframe, which is backhaul uplink subframe from among the uplink subframes for the SRS transmission and is subsequently the closest to the first uplink subframe, to the base station.

10 Claims, 11 Drawing Sheets

(56) References Cited

U.S. PATENT DOCUMENTS

2010/0246463 A1* 9/2010 Papasakellariou et al. ... 370/311
2012/0163288 A1* 6/2012 Kim et al. ............ 370/315
2013/0039289 A1* 2/2013 Lee et al. ............ 370/329
2013/0194908 A1* 8/2013 Gao et al. ............ 370/203

* cited by examiner (a) control-plane protocol stack (b) user-plane protocol stack

METHOD AND DEVICE FOR A RELAY NODE TO TRANSMIT A SOUNDING REFERENCE SIGNAL TO A BASE STATION IN A WIRELESS COMMUNICATION SYSTEM

This Application is a 35 U.S.C. §371 National Stage Entry of International Application No. PCT/KR2011/007062, filed Sep. 26, 2011 and claims the benefit of U.S. Provisional Application No. 61/424,036, filed Dec. 16, 2010, all of which are incorporated by reference in their entirety herein.

TECHNICAL FIELD

The present invention relates to a wireless communication system, and more particular to a method and apparatus for enabling a relay node (RN) to transmit a sounding reference signal (SRS) to a base station (BS).

BACKGROUND ART

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

Referring to FIG. 1, the E-UMTS system is broadly made up of a User Equipment (UE), base stations (or eNode-Bs), and an Access Gateway (AG) which is located at an end of a network (E-UTRAN) and is connected to an external network. Generally, an eNode-B can simultaneously transmit multiple data streams for a broadcast service, a multicast service and/or a unicast service.

Recently, 3GPP has been establishing a standard task for a subsequent technique of LTE. In this specification, such a technique is referred to as "LTE-Advanced" or "LTE-A". One of the main differences between an LTE system and an LTE-A system is a system bandwidth.

DISCLOSURE

Technical Problem

Accordingly, the present invention is directed to a method and apparatus for enabling a relay node (RN) to transmit a sounding reference signal (SRS) to a base station (BS) in a wireless communication system that substantially obviates one or more problems due to limitations and disadvantages of the related art.

Technical Solution

Prior to describing a technical solution of the present invention, a second uplink subframe to be described later is defined as a subframe capable of simultaneously satisfying a backhaul uplink subframe and a UE-specific aperiodic SRS subframe. Although the first uplink subframe is a UE-specific aperiodic SRS subframe, the first uplink subframes can be classified into a backhaul uplink subframe or the remaining subframes other than the backhaul uplink subframe.

The object of the present invention can be achieved by providing a method for transmitting a sounding reference signal (SRS) to a base station (BS) by a relay node (RN) in a wireless communication system including: receiving backhaul downlink (DL) subframe configuration information from the base station (BS); allocating backhaul uplink (UL) subframes on the basis of the received backhaul DL subframe configuration information; receiving configuration information of UL subframes needed for SRS transmission from the base station (BS); receiving an indicator for triggering the SRS transmission from the base station (BS); and if a first UL subframe from among the UL subframes for the SRS transmission is used as the backhaul UL subframe, transmitting the SRS to the base station (BS) in the first UL subframe. If the first UL subframe is not used as the backhaul UL subframe, the SRS is not transmitted to the base station (BS), or the SRS is transmitted to the base station (BS) at a second UL subframe that acts as the closest UL subframe after lapse of the first UL subframe while simultaneously being used as the backhaul UL subframe.

In accordance with another aspect of the present invention, a relay node (RN) for transmitting a sounding reference signal (SRS) in a wireless communication system includes: a reception module configured to receive backhaul downlink (DL) subframe configuration information from a base station (BS); a processor configured to allocate backhaul uplink (UL) subframes on the basis of the received backhaul DL subframe configuration information; a reception module configured to receive configuration information of UL subframes needed for SRS transmission from the base station (BS), and receive an indicator for triggering the SRS transmission from the base station (BS); and a transmission module which transmits the SRS to the base station (BS) in the first UL subframe if a first UL subframe from among the UL subframes for the SRS transmission is used as the backhaul UL subframe, does not transmit the SRS to the base station (BS) if the first UL subframe is not used as the backhaul UL subframe, or transmits the SRS to the base station (BS) at a second UL subframe that acts as the closest UL subframe after lapse of the first UL subframe while simultaneously being used as the backhaul UL subframe.

The backhaul UL subframes may be comprised of subframes obtained after access DL subframes are excluded from DL subframes designated by the received backhaul DL subframe configuration information and are then delayed by four subframes.

The access DL subframes may be subframes having indices #0, #4, #5, and #9.

The configuration information of the UL subframes for the SRS transmission may include an offset value and a periodicity for transmission of the SRS, the offset value may indicate a relative position of a subframe at which the SRS transmission is possible, and the periodicity may indicate a subframe configuration for transmission of the SRS.

A transmission power of the SRS transmitted in the second UL subframe may be established by a power parameter for the SRS transmission configured in the first UL subframe.

A transmission power of the SRS transmitted in the second UL subframe may be established by a power parameter updated between the first UL subframe and the second UL subframe.

The sounding reference signal (SRS) may be transmitted through either a total band of a frequency axis of the predetermined second UL subframe or a partial band of a frequency axis of the second UL subframe.

The sounding reference signal (SRS) may be transmitted using a predetermined hopping pattern when an aperiodic sounding reference signal (A-SRS) is transmitted in the second UL subframe.

Effects of the Invention

As is apparent from the above description, exemplary embodiments of the present invention have the following effects. A relay node (RN) for use in a wireless communication system can effectively transmit a sounding reference signal (SRS) to a base station (BS).

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE or LTE-A system, but the present invention is not limited thereto and the remaining parts of the present invention other than unique characteristics of the 3GPP LTE or LTE-A system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

In accordance with the scheme proposed by one embodiment of the present invention, A-SRS transmission may be applied to a Frequency Division Duplex (FDD) system and a Time Division Duplex (TDD) system.

In addition, the proposed scheme may be applied to A-SRS transmission between the eNB (BS) and the RN, and may also be applied to A-SRS transmission between the RN and the R-UE (Relay-node based UE).

In addition, the scheme for transmitting the sounding reference signal (SRS) according to one embodiment may be applied not only to aperiodic SRS transmission but also to periodic SRS transmission, because a subframe used at the periodic SRS transmission time is not identical to a backhaul uplink frame.

Figure 1:
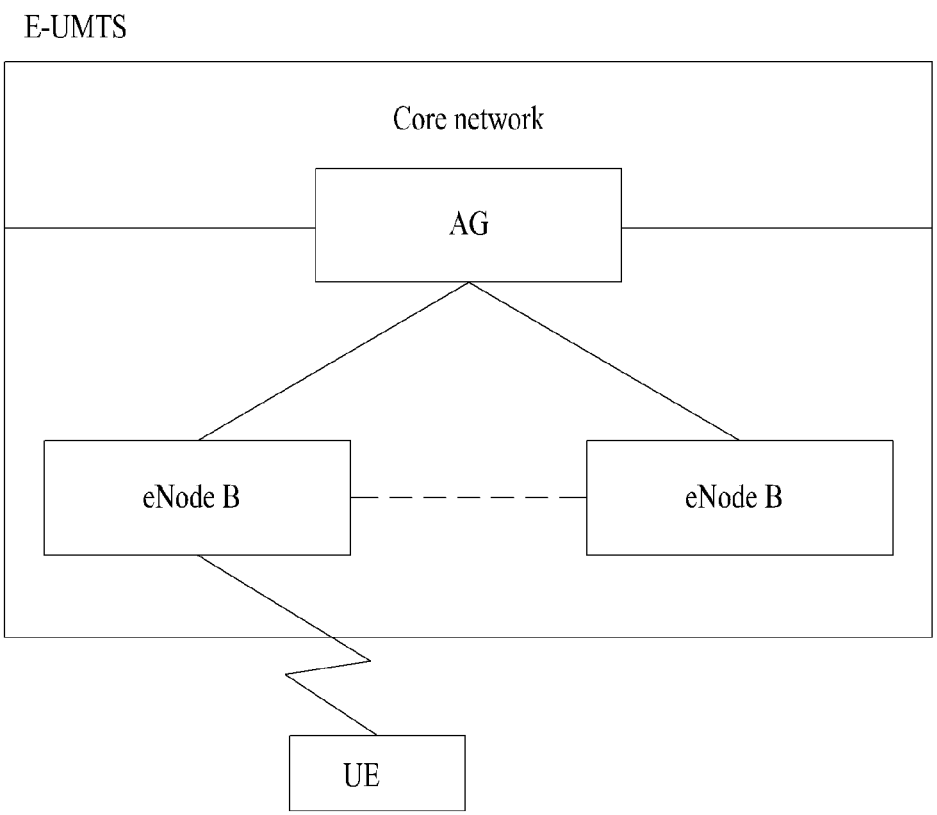
FIG. 1 is a conceptual diagram illustrating an Evolved Universal Mobile Telecommunications System (E-UMTS) network structure as an example of a wireless communication system.
Figure 2:
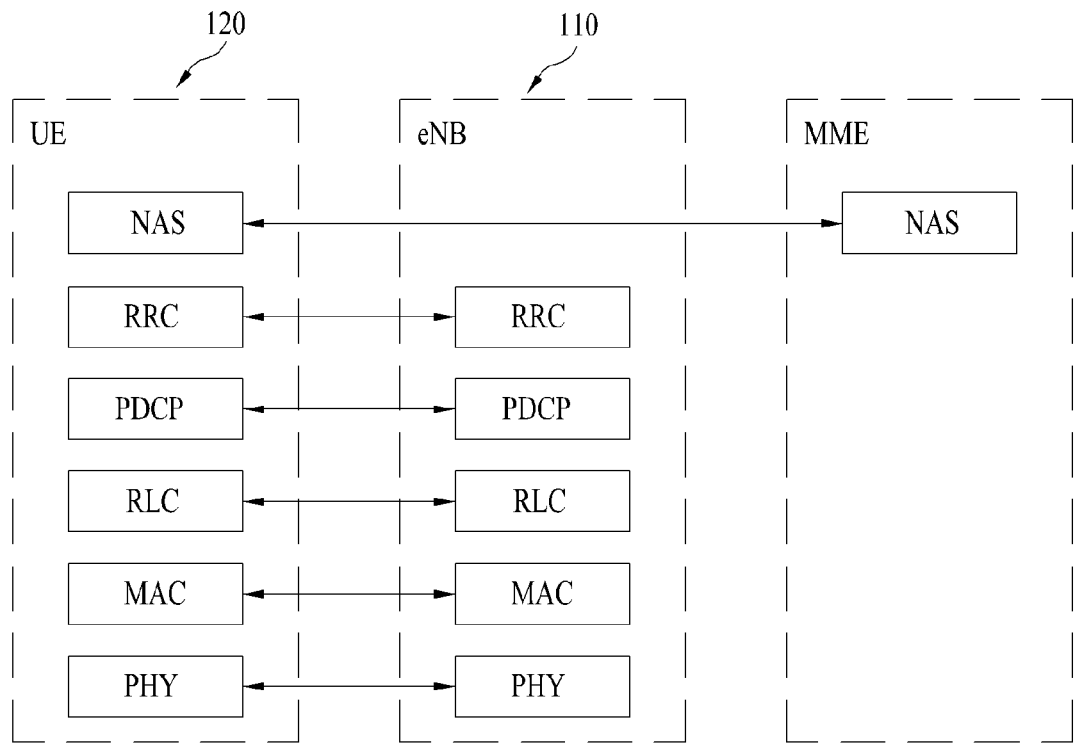
FIG. 2 illustrates a control plane and a user plane (U-Plane) of a radio interface protocol between a User Equipment (UE) and an E-UTRAN according to the 3GPP wireless access network standard.
Figure 2:
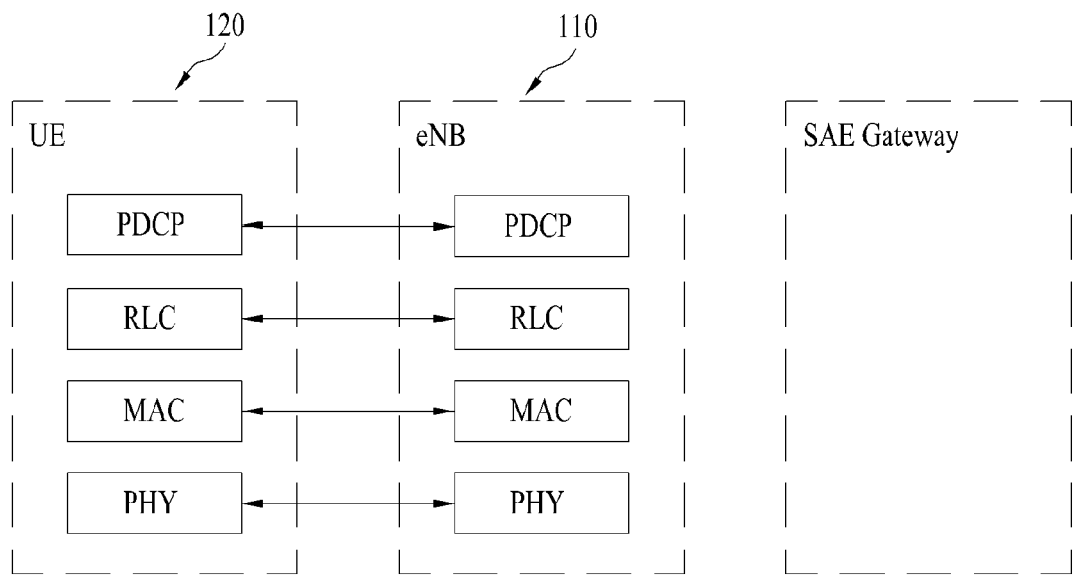

FIG. 2 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages. The UE is in RRC connected mode if an RRC connection has been established between the RRC layer of the network and the RRC layer of the UE. Otherwise, the UE is in RRC idle mode. A Non-Access Stratum (NAS) layer located above the RRC layer performs functions such as session management and mobility management.

One cell of the eNB (eNode-B) is set to use a bandwidth such as 1.25, 2.5, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
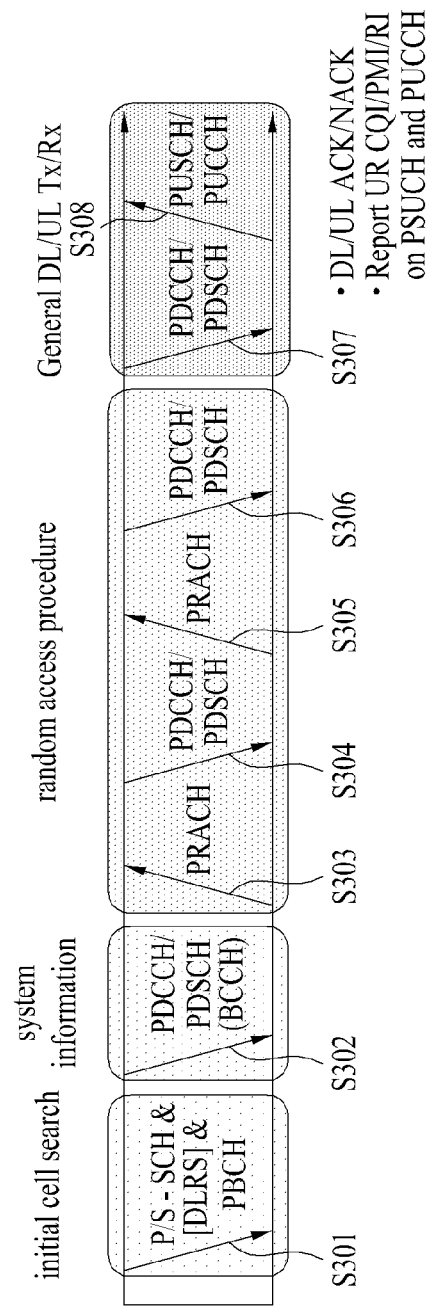
FIG. 3 is a conceptual diagram illustrating physical channels for use in a 3GPP system and a general method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps S303 and S305 and receive a response message for the random access on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. Uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
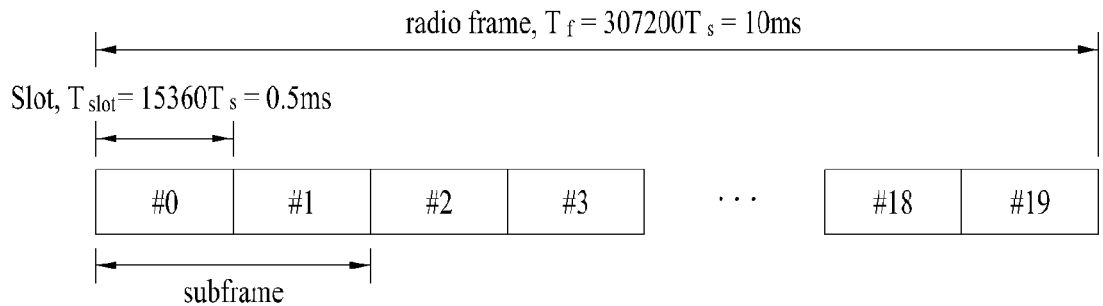
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms ($327200 \cdot T_s$) and includes 10 subframes of equal size. Each subframe has a length of 1 ms and includes two slots. Each slot has a length of 0.5 ms ($15360 \cdot T_s$). In this case, $T_s$ represents sampling time, and is expressed by '$T_s=1/(15 \text{ kHz} \times 2048)=3.2552 \times 10^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM symbols in each slot.

Figure 5:
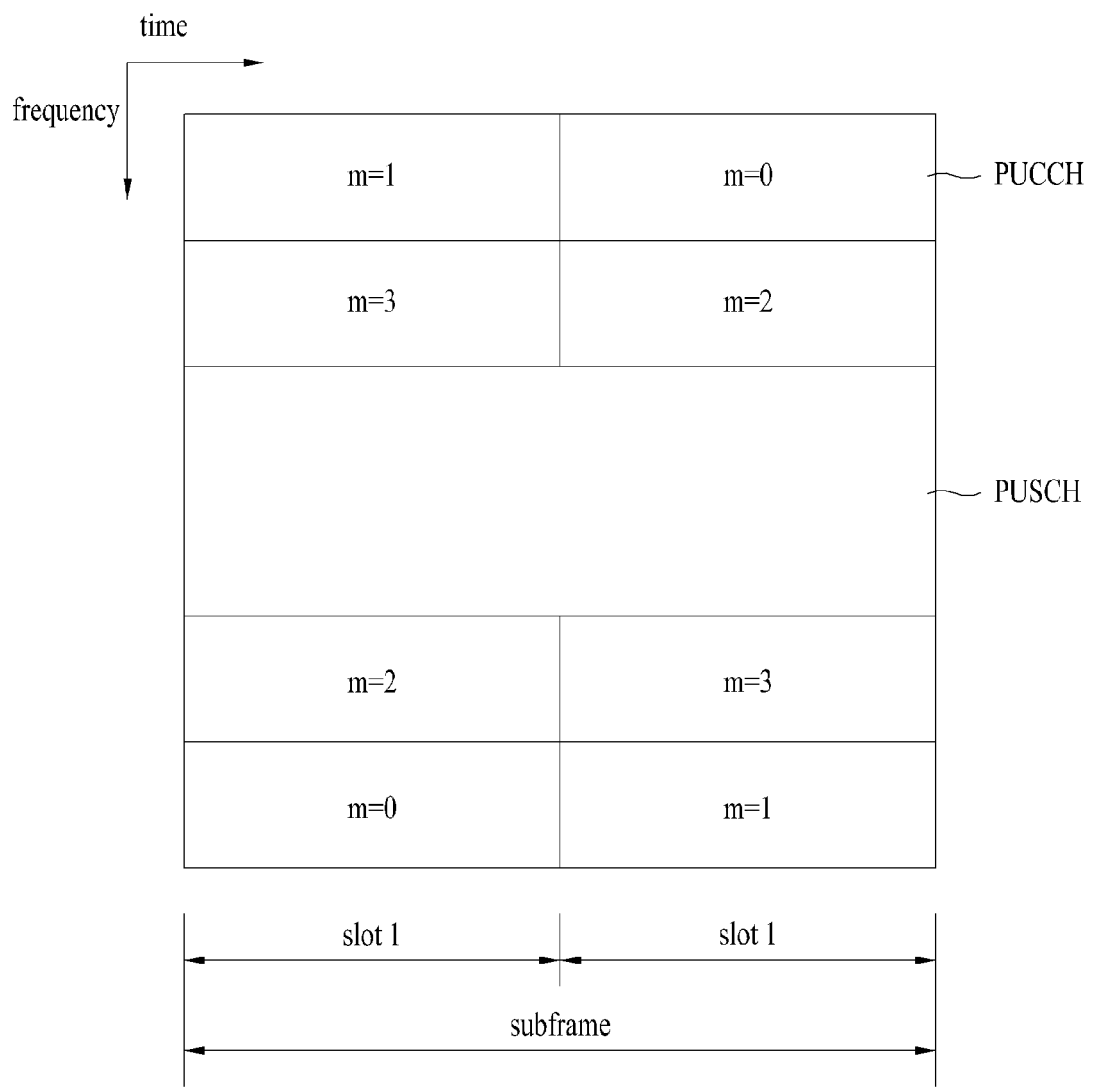
FIG. 5 illustrates a downlink (DL) radio frame structure for use in an LTE system.

FIG. 5 shows an uplink subframe structure for use in an LTE system.

Referring to FIG. 5, the UL subframe includes a plurality of slots (e.g., two slots). Each slot may include a plurality of SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes a pair of RBs (e.g., m=0, 1, 2, 3) located at both ends of the data region on the frequency axis (specifically, a pair of RBs at frequency mirrored locations) and hops between slots. The UL control information (i.e., UCI) includes HARQ ACK/NACK, Channel Quality Information (CQI), Precoding Matrix Indicator (PMI), and Rank Indication (RI).

Figure 6:
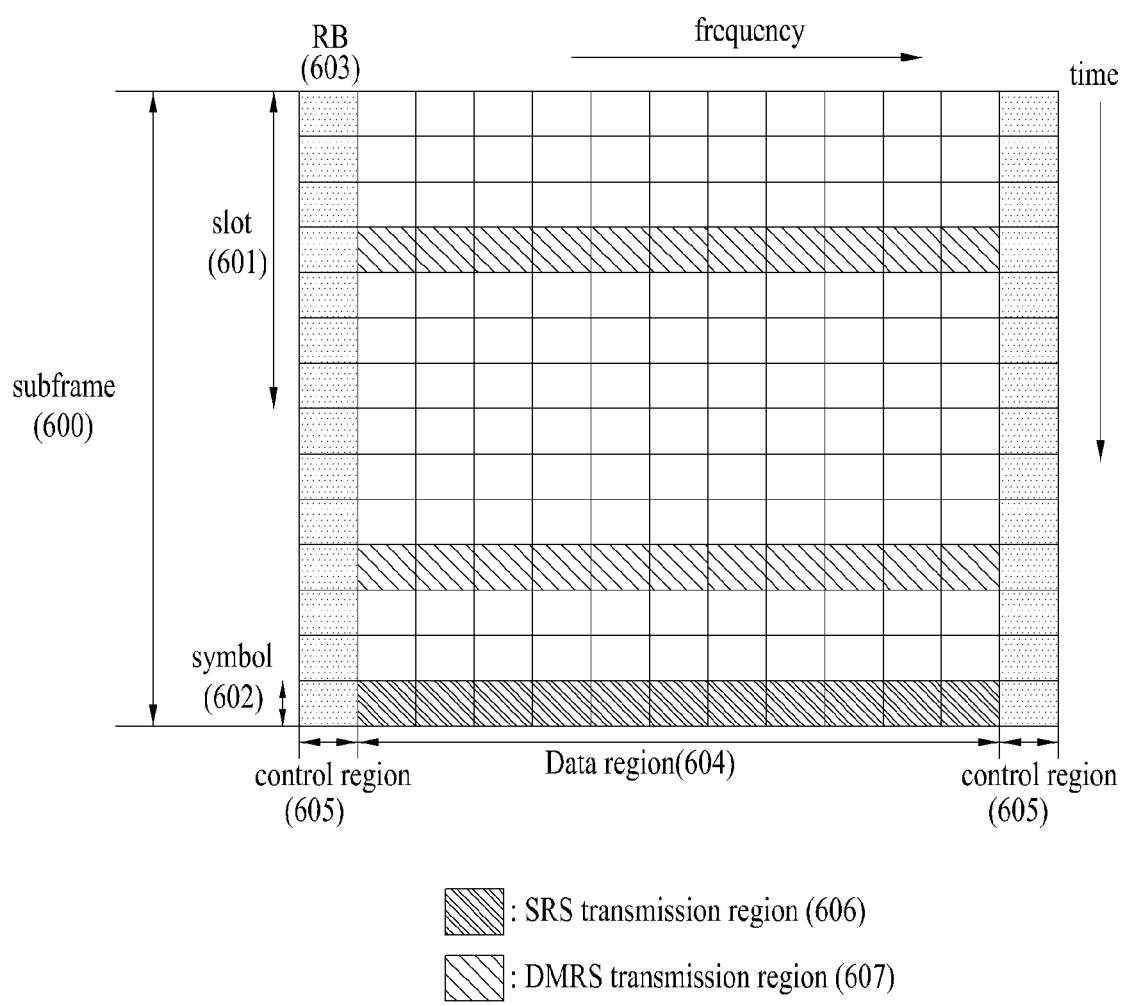
FIG. 6 illustrates an uplink (UL) subframe structure for use in an LTE system.

FIG. 6 exemplarily shows an uplink (UL) subframe structure for use in an LTE system.

Referring to FIG. 6, a subframe 600 having a length of 1 ms, which is a basic unit of LTE uplink transmission, includes two 0.5 ms slots 601. Assuming the length of a normal Cyclic Prefix (CP), each slot includes 7 symbols 602 and one symbol corresponds to one SC-FDMA symbol. A resource block 603 is a resource allocation unit corresponding to 12 subcarriers in a frequency domain and one slot in a time domain. The structure of the LTE uplink subframe is broadly divided into a data region 604 and a control region 605. The data region refers to a series of communication resources used for transmission of data such as voice and packets transmitted to each UE and corresponds to resources except for a control region in a subframe. The control region refers to a series of communication resources used for transmission of downlink channel quality report from each UE, reception ACK/NACK for a downlink signal, uplink scheduling request, and the like.

A maximum of three OFDM symbols located in the front of the downlink subframe are used as a control region to which control channels are allocated, and the remaining OFDM symbols are used as a data region to which a Physical Downlink Shared Channel (PDSCH) channel is allocated.

DL control channel for use in the 3GPP LTE system includes a Physical Control Format Indicator CHannel (PCFICH), a Physical Downlink Control Channel (PDCCH), a Physical Hybrid-ARQ Indicator CHannel (PHICH), and the like. PCFICH transmitted through a first OFDM symbol of the subframe may carry information about the number of OFDM symbols (i.e., the size of control region) used for transmission of control channels within the subframe. Control information transmitted through PDCCH is referred to as downlink control information (DCI). The DCI may indicate UL resource allocation information, DL resource allocation information, UL transmission power control commands of arbitrary UE groups, etc. PHICH may carry ACK (Acknowledgement)/NACK (Not-Acknowledgement) signals about an UL Hybrid Automatic Repeat Request (UL HARQ). That is, the ACK/NACK signals about UL data transmitted from the UE are transmitted over PHICH.

PDCCH acting as a DL physical channel will hereinafter be described in detail.

A base station (BS) may transmit information about resource allocation and transmission format of PDSCH (hereinafter referred to as DL grant), resource allocation information of PUSCH (hereinafter referred to as UL grant), an aggregate of transmission power control commands for individual UEs of a UE group, information about Voice over Internet Protocol (VoIP) activation, etc. A plurality of PDCCHs may be transmitted within the control region, and the UE may monitor the PDCCHs. Each PDCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs.

Control information transmitted over PDCCH is referred to as downlink control information (DCI). The following Table 1 shows DCIs in response to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

In Table 1, DCI format 0 may indicate uplink resource allocation information. DCI format 1 and DCI format 2 may indicate downlink resource allocation information. DCI format 3 and DCI format 3A may indicate uplink transmit power control (TPC) commands for arbitrary UE groups.

As shown in FIG. 6, a region 606 where a Sounding Reference Signal (SRS) can be transmitted within one subframe is an interval where the last SC-FDMA symbol is located on a time domain within one subframe and the SRS is transmitted through a data transmission band on a frequency domain. SRSs of several UEs transmitted through the last SC-FDMA symbol of the same subframe may be distinguished according to frequency positions.

In a mobile communication system, a packet (or signal) is transmitted on a radio frequency (RF) channel from a transmitter to a receiver. The packet transmitted from the transmitter is transmitted over the RF channel so that the packet or signal may be distorted during the transmission. In order to enable the receiver to correctly receive the distorted signal, the receiver should compensate for the distortion in the received signal using channel information, i.e., distortion of the received signal should be corrected using channel information. In order to detect the channel information, a method of transmitting a signal, of which both the transmitter and the receiver are aware, and detecting channel information using a distortion degree when the signal is received through a channel is mainly used. The above signal is referred to as a reference signal (RS) or a pilot signal.

In the conventional system, the transmitter transmits a packet to the receiver using one transmit (Tx) antenna and one receive (Rx) antenna. Most current mobile communication systems adopt multiple transmit (Tx) antennas and multiple receive (Rx) antennas to improve transmission/reception data efficiency. In case of data transmission and reception through multiple antennas in a mobile communication system for the purpose of improving capacity and communication performance, a reference signal exists separately for each transmit antenna. The receiver can successfully receive a signal transmitted from each transmit (Tx) antenna using a known reference signal for each transmit (Tx) antenna.

In a mobile communication system, RSs may be divided into an RS for channel information acquisition and an RS for data demodulation. The former needs to be transmitted over a broadband because it is for acquiring downlink channel information of a UE and to be received and measured by a UE even if the UE does not receive downlink data in a specific subframe. This RS for channel measurement may be used for measurement of handover. The latter is transmitted with a corresponding resource when the BS or eNB sends a downlink signal. A UE receives this RS to perform channel estimation and demodulate data. This RS for demodulation needs to be transmitted in a data transmission region.

In a 3GPP LTE release-8 system acting as one example of the mobile communication system, two types of downlink RSs are defined for unicast service. That is, there are a common reference signal (CRS) used for channel state information acquisition and handover measurement and a dedicated reference signal (DRS) (corresponding to UE-specific RS) used for data demodulation. In LTE release-8 system, the UE-specific RS is used only for data demodulation, whereas the CRS is used for channel information acquisition and data demodulation. The CRS is a cell-specific RS, and the BS (or eNB) transmits a CRS for each subframe over a wideband. Cell-specific CRS s are transmitted for up to four antenna ports according to the number of transmit antennas of the BS (eNB).

A sounding reference signal (SRS) is not associated with uplink data and/or control information transmission. The SRS is used for the BS (eNB) to estimate a channel quality and perform uplink frequency-selective scheduling based on the channel quality measurement. However, the SRS may also be used for enhanced power control or for providing various functions for non-scheduled UEs. The SRS used for uplink channel measurement and as a pilot signal transmitted from a UE to an eNB is used for the eNB to estimate the state of a channel from each UE to the eNB. Channels on which the SRS is transmitted may have different transmission bandwidths and transmission intervals for UEs according to UE states. The BS (eNB) may determine a UE whose data channel is scheduled on the basis of a channel estimation result.

The SRS may be used to estimate downlink channel quality on the assumption of the reciprocity of a radio frequency (RF) channel between the downlink and the uplink. This assumption is valid especially in a time division duplex (TDD) system in which downlink and uplink share the same frequency band and are distinguished by time. A subframe in which a UE within a cell is supposed to transmit an SRS is indicated by cell-specific broadcast signaling. A 4-bit cell-specific parameter 'srsSubframeConfiguration' indicates 15 possible sets of subframes carrying SRSs in each radio frame. This configuration may provide flexibility with which SRS overhead can be adjusted. An SRS may be transmitted in the last SC-FDMA symbol of a configured subframe.

Therefore, an SRS and a DMRS are positioned in different SC-FDMA symbols in a subframe. SRSs of UEs, transmitted in the last SC-FDMA symbols of the same subframe, may be distinguished by frequency positions thereof. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated using a constant amplitude zero auto correlation (CAZAC) sequence. SRSs transmitted from a plurality of UEs are CAZAC sequences $r^{SRS}(n) = r_{u,v}^{(\alpha)}(n)$ having different cyclic shift values according to [Equation 1]. Here, $r^{SRS}(n)$ represents an SRS sequence.

$$\alpha = 2\pi \frac{n_{SRS}^{cs}}{8}$$ [Equation 1]

Here, $n_{SRS}^{cs}$ is a value set for each UE by a higher layer and is an integer in a range of 0 to 9. CAZAC sequences generated from one CAZAC sequence through cyclic shift have zero-correlation with sequences having cyclic shift values different those thereof. By using this characteristic, SRSs in the same frequency region can be distinguished by CAZAC sequence cyclic shift value. An SRS of each UE is allocated in the frequency domain according to a parameter set by the eNB. A UE performs frequency hopping of an SRS such that the SRS can be transmitted over the entire data transmission bandwidth.

As described above, a 3GPP LTE Release 8/9 system supports only periodic SRS transmission of UEs. This allows the BS (or eNB) to estimate uplink channel quality of each UE. Here, the channel estimated by the BS (eNB) is used for functions such as frequency dependent scheduling, link level adaptation, timing estimation, and UL power control. The BS (eNB) may transmit an SRS uplink configuration to each UE through higher layer signaling (for example, RRC signaling) or the like in a UE-specific or cell-specific manner using an SRS parameter. The BS (eNB) may notify the UE of SRS uplink configuration information through an SRS uplink configuration information element message type as shown in the following Table 2.

TABLE 2

```
SoundingRS-UL-Config information element

ASN1START
SoundingRS-UL-ConfigCommon ::=     CHOICE {
    release                            NULL,
    setup                              SEQUENCE {
        srs BandwidthConfig                ENUMERATED {bw0, bw1, bw2, bw3, bw4, bw5, bw6, bw7},
        srs-SubframeConfig                 ENUMERATED {
                                               sc0, sc1, sc2, sc3, sc4, sc5, sc6, sc7,
                                               sc8, sc9, sc10, sc11, sc12, sc13, sc14, sc15},
        ackNackSRS-SimultaneousTransmission BOOLEAN,
        srs-MaxUpPts                       ENUMERATED {true}       OPTIONAL    -- Cond TDD
    }
}
SoundingRS-UL-ConfigDedicated ::=    CHOICE{
```

TABLE 2-continued

SoundingRS-UL-Config information element

| | |
|---|---|
| release | NULL, |
| setup | SEQUENCE { |
| srs-Bandwidth | ENUMERATED {bw0, bw1, bw2, bw3}, |
| srs-HoppingBandwidth | ENUMERATED {hbw0, hbw1, hbw2, hbw3}, |
| freqDomainPosition | INTEGER (0..23), |
| duration | BOOLEAN, |
| srs-ConfigIndex | INTEGER (0..1023), |
| transmissionComb | INTEGER (0..1), |
| cyclicShift | ENUMERATED {cs0, cs1, cs2, cs3, cs4, cs5, cs6, cs7} |
| -- ASN1STOP | |

The following Table 3 shows SRS configuration parameters included in a SoundingRS-UL-Config information element message type in the above Table 2.

TABLE 3

| Sounding RS parameter name | Significance | Signalling type |
|---|---|---|
| srsBandwidthConfiguration | Maximum SRS bandwidth in the cell | Cell-specific |
| srsSubframeConfiguration | Sets of subframes in which SRS may be transmitted in the cell | Cell-specific |
| srsBandwidth | SRS transmission bandwidth for a UE | UE-specific |
| frequencyDomainPosition | Frequency-domain position | UE-specific |
| srsHoppingBandwidth | Frequency hop size | UE-specific |
| Duration | Single SRS or periodic | UE-specific |
| srsConfigurationIndex | Periodicity and subframe offset | UE-specific |
| transmissionComb | Transmission comb offset | UE-specific |
| $n^{cs}_{SRS}$ | Cyclic shift | UE-specific |

As shown in Tables 2 and 3, the SRS configuration information that the BS (eNB) provides to the UE may include, as SRS configuration parameters, an srsBandwidthConfiguration parameter, srsSubframeConfiguration parameter, an srsBandwidth parameter, a frequencyDomainPosition parameter, an SrsHoppingBandwidth parameter, a duration parameter, an srsConfigurationIndex parameter, and a transmissionComb parameter. The srsBandwidthConfiguration parameter represents maximum SRS bandwidth information in the cell and the srsSubframeConfiguration parameter represents information of sets of subframes in which the UE may transmit an SRS in the cell. The BS (eNB) may notify the UE of the srsSubframeConfiguration parameter through cell-specific signaling. As shown in Table 2, the BS (eNB) may signal the srsSubframeConfiguration parameter in a 4-bit size (indicating sc0, sc1, sc2, sc3, sc4, sc5, sc6, sc7 sc8 sc9 sc10, sc11, sc12, sc13, sc14, and sc15) to the UE. The srsBandwidth parameter represents an SRS transmission bandwidth for the UE, the frequencyDomainPosition parameter represents a position in the frequency domain, the SrsHoppingBandwidth parameter represents an SRS frequency hop size, the duration parameter represents whether SRS transmission is single or periodic SRS transmission. The srsConfigurationIndex parameter represents periodicity and a subframe offset (for example, a time unit corresponding to an interval between the first subframe and a subframe in which the first SRS is transmitted in a frame), and the transmissionComb parameter represents a transmission comb offset.

The BS (eNB) may notify the UE of the srsBandwidthConfiguration parameter and the srsSubframeConfiguration parameter through cell-specific signaling. On the contrary, the BS (eNB) may individually notify each UE of the srsBandwidth parameter, the frequencyDomainPosition parameter, the SrsHoppingBandwidth parameter, the duration parameter, the srsConfigurationIndex parameter, and the transmissionComb parameter through UE-specific signaling.

The 3GPP LTE Release 10 system supports aperiodic SRS transmission for more adaptive uplink channel quality estimation and more efficient use of SRS resources than the conventional system. A method for triggering aperiodic SRS transmission is currently under discussion. For example, the BS (eNB) may perform triggering using a DL/UL grant in a PDCCH. That is, the BS (eNB) may transmit an aperiodic SRS transmission triggering indicator for triggering aperiodic SRS transmission of the UE through a DL grant or a UL grant including the indicator or may transmit the indicator in a newly defined message format. The present invention will now be described with reference to an aperiodic SRS triggering grant (or aperiodic SRS triggering indicator) as an example of a message for triggering aperiodic SRS transmission of the UE.

First, it is possible to consider that per-cell-specific periodic SRS resources and UE-specific periodic SRS resources, which are defined in the 3GPP LTE Release 8/9 system, are reused as resources for aperiodic SRS transmission in the suggested method. Accordingly, this method decreases overhead required for signaling SRS resource position information and enables efficient use of SRS resources, compared to methods in which additional new aperiodic SRS resources are defined.

Aperiodic SRS configurations that the BS (eNB) transmits through higher layer signaling may be variously defined as parameters such as SRS bandwidth, comb, hopping bandwidth, and start Physical Resource Block (PRB) allocation have various values.

As described above, the UE role is carried out by the relay node (RN). That is, the relay node (RN) is connected to a link between a UE and a BS (eNB).

Figure 7:
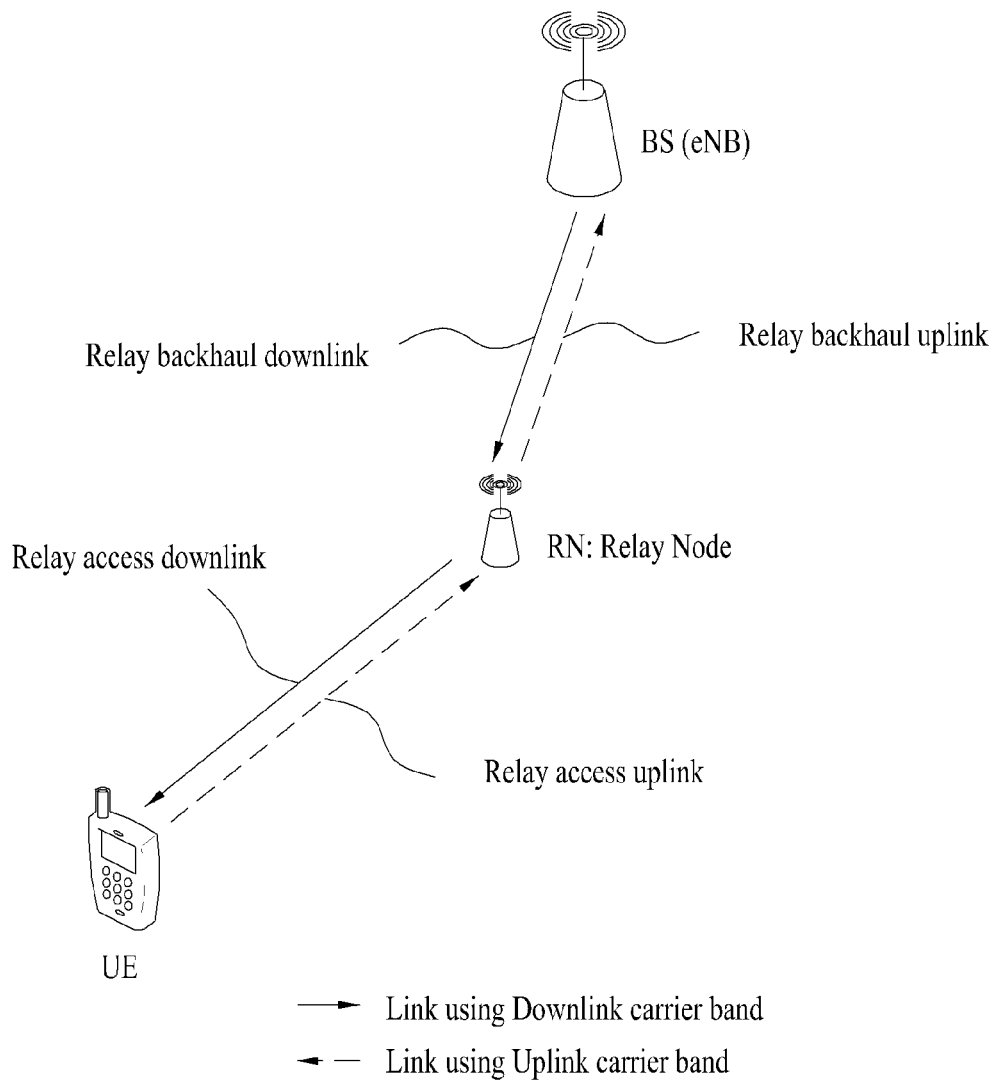
FIG. 7 is a conceptual diagram illustrating a relay backhaul link and a relay access link for use in a wireless communication system.

FIG. 7 is a conceptual diagram illustrating a relay backhaul link and a relay access link for use in a wireless communication system.

Referring to FIG. 7, as the relay node (RN) is introduced to perform forwarding of link connection between the BS and the UE in 3GPP LTE-A, two links having different attributes are applied to a UL carrier frequency band and a DL carrier frequency band. The connection link between the BS and the RN is defined as a backhaul link. Transmission of a backhaul link using either resources of a downlink frequency band (i.e., the case of Frequency Division Duplex (FDD)) or resources of a downlink subframe (i.e., the case of Time Division Duplexing (TDD)) is referred to as backhaul downlink.

Transmission of backhaul link using either resources of an uplink frequency band (i.e., the case of FDD) or resources of an uplink subframe (i.e., the case of TDD) is referred to as backhaul uplink.

On the other hand, the connection link between the relay node (RN) and a series of UEs is defined as a relay access link. If the relay access link is transmitted using resources of the downlink frequency band (i.e., the case of FDD) or resources of a downlink subframe (i.e., the case of TDD), the above-mentioned transmission operation is denoted by an access downlink. Otherwise, if the relay access link is transmitted using resources of the uplink frequency band (i.e., the case of FDD) or resources of an uplink subframe (i.e., the case of TDD), the above-mentioned transmission operation may be represented by an access uplink.

The RN may receive information from the BS through a relay backhaul downlink, and may transmit information to the BS through a relay backhaul uplink. In addition, the relay node may transmit information to the UE through the relay access downlink, or may receive information from the UE through the relay access uplink.

Meanwhile, in association with the band (or spectrum) of the relay node (RN), one case in which the backhaul link operates in the same frequency band as in the access link is referred to as 'in-band', and the other case in which the backhaul link operates in a frequency band different from that of the access link is referred to as 'out-band'. In the above-mentioned two cases of in-band and out-band, it is necessary for a UE (hereinafter referred to as a legacy UE) that is operated in the legacy LTE system (for example, Release-8) to access a donor cell.

Relay nodes (RNs) can be classified into a transparent RN and a non-transparent RN according to whether or not the UE recognizes the RN. The transparent RN indicates an exemplary case in which it is impossible to recognize whether the UE communicates with a network through the RN, and the non-transparent RN indicates another exemplary case in which it is possible to recognize whether the UE communicates with a network through the RN.

In relation to the RN control, RNs can be classified into a relay node serving as a part of a donor cell and another relay node capable of controlling a cell alone.

Although the relay node (RN) serving as a part of the donor cell may have an RN identifier (ID), the RN does not have a unique cell identity. If Radio resource Management (RPM) is partially controlled by the BS including the donor cell (although the remaining parts of RPM are located in the RN), the above-mentioned RN is considered to be a relay node (RN) serving as a part of the donor cell. Preferably, the above-mentioned RN may support the legacy UE. For example, smart repeaters, decode-and-forward relay nodes, a variety of L2 ($2^{nd}$ layer) RNs, and Type-2 RNs may be allocated to the above-mentioned RN.

According to the relay node (RN) capable of controlling the cell alone, this RN controls one or more cells, provides a unique physical layer cell identity to each cell controlled by the RN, and is able to use the same RPM mechanism. From the viewpoint of the UE, there is no difference between accessing a cell controlled by the RN and accessing a cell controlled by a general BS. Preferably, cells controlled by the above-mentioned RNs may support the legacy UE. For example, a Self-backhauling RN, L3 ($3^{rd}$ layer) RN, Type-1 RN, and Type-1a RN may be allocated to the above-mentioned RN.

The Type-1 RN controls a plurality of cells using In-band RN, and the UE considers each cell to be a separate cell distinguished from the donor cell. In addition, several cells are assigned respective physical cell IDs (defined in LTE Release-8), and the RN may transmit its own synchronization channel, a reference signal, and the like. In the case of single-cell operation, the UE can directly receive scheduling information and HARQ feedback from the RN, and can transmit its own control channel information (scheduling request (SR), CQI, ACK/NACK, etc.) to the RN. In addition, the legacy UE (that is operated according to LTE Release-8) considers Type-1 RN to be a legacy BS (that is operated according to LTE Release-8). That is, the Type-1 RN has backward compatibility. On the other hand, from the viewpoint of a UE that is operated according to the LTE-A system, the Type-1 RN is considered to be different from the legacy BS, resulting in improved performance or throughput.

The Type-1a RN is operated in the out-band, and has the same characteristics as those of the Type-1 RN. The Type-1a RN operation may be configured to minimize (or eliminate) the influence of L1 ($1^{st}$ layer) operation.

The Type-2 RN may be an In-band RN, does not have a separate physical cell ID, and does not form a new cell. The Type-2 RN considers the legacy UE to be transparent, and the legacy UE is unable to recognize the presence of the Type-2 RN. Although the Type-2 RN transmits PDSCH, it should be noted that the Type-2 RN does not transmit CRS and PDCCH.

On the other hand, in order for the RN to operate in the in-band, some resources for use in the time-frequency domains must be reserved for a backhaul link and these resources may not be used for the access link. The above-mentioned resource definition is called 'resource partitioning'.

General principles related to resource partitioning in the relay node (RN) will be given below. The backhaul downlink and the access downlink can be multiplexed in one carrier frequency according to the Time Division Multiplexing (TDM) scheme (that is, only one of the backhaul downlink and the access downlink can be activated at a specific time). Similar to this, the backhaul uplink and the access uplink can be TDM-multiplexed in one carrier frequency according to the TDM scheme (that is, only one of the backhaul uplink and the access uplink can be activated at a specific time).

In association with the backhaul link multiplexing based on the FDD scheme, backhaul downlink transmission is carried out in a downlink frequency band, and backhaul uplink transmission is carried out in an uplink frequency band. In association with the backhaul link multiplexing based on the TDD scheme, backhaul downlink transmission is carried out in a downlink subframe of the BS and the RN, and backhaul uplink transmission is carried out in an uplink subframe of the BS and the RN.

In the case of In-band RN, provided that backhaul downlink is received from the BS within a predetermined frequency band and at the same time access downlink is transmitted to the UE within the same frequency band, a signal transmitted from the transmitter of the RN may be received from the receiver of the RN, such that signal interference or RF jamming may occur in the RF front-end of the RN. Similar to this, assuming that the access uplink is received from the UE within a predetermined frequency band and at the same time the backhaul uplink is transmitted to the BS within the same frequency band, signal interference may occur in the RF front-end of the RN. Therefore, the present invention has difficulty in implementing simultaneous transmission/reception within one frequency band of the RN on the condition that a reception (Rx) signal and a transmission (Tx) signal are not spaced apart from each other (for example, the Tx antenna and the Rx antenna are not geographically spaced apart from each other (e.g., one of the Tx and Rx antennas is installed on the ground one is installed underground)).

The communication scheme proposed by the present invention on the above-mentioned assumption will hereinafter be described in detail.

Figure 8:
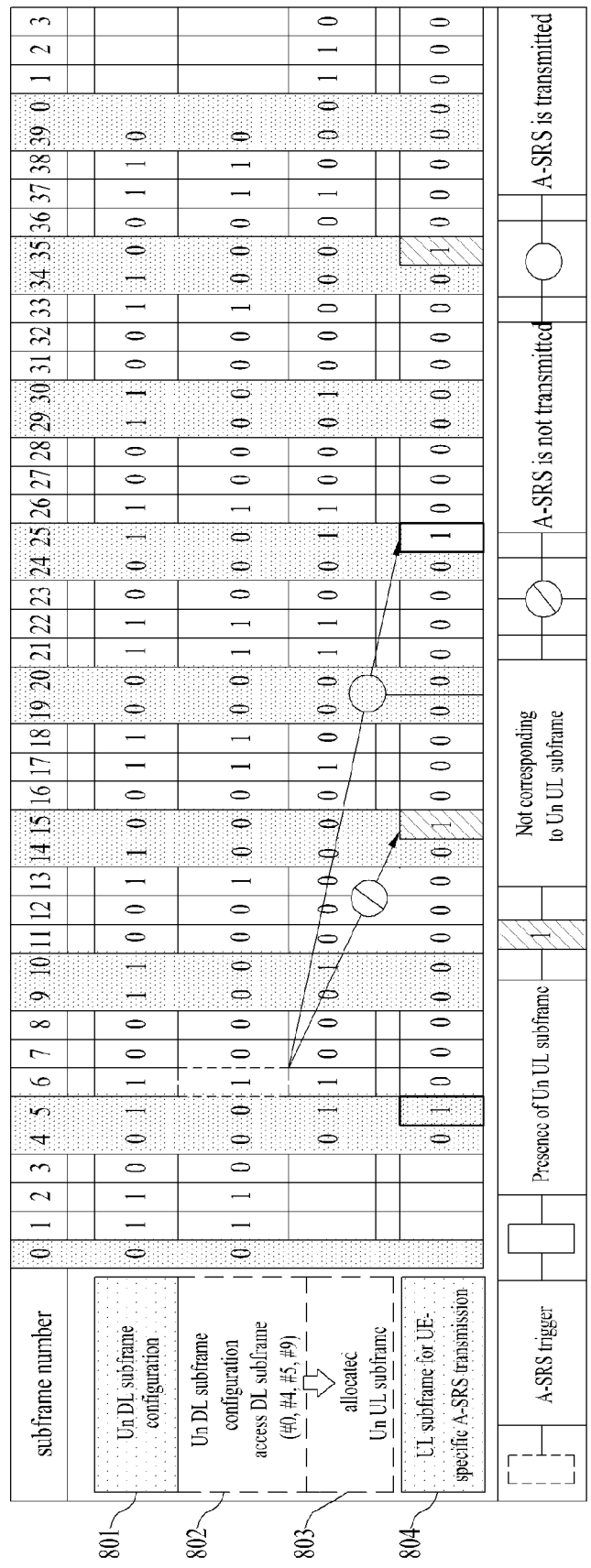
FIG. 8 is a conceptual diagram illustrating a method for establishing an uplink subframe to transmit a sounding reference signal (SRS) according to one embodiment of the present invention.

FIG. 8 is a conceptual diagram illustrating one example of a subframe for transmitting an aperiodic sounding reference signal (SRS) signal in an FDD system.

In the present invention, for backhaul downlink communication, a macro eNB (MeNB) may inform a relay node (RN) of backhaul downlink subframe configuration information (having a period of 8 ms) through RRC signaling. Preferably, the backhaul downlink subframe configuration information may be 8 bits long. In this case, the relationship between the backhaul downlink subframe and the backhaul uplink subframe is based on the subframe (n+4) allocated to the backhaul UL subframe on the assumption that the subframe having an index (n) is a backhaul downlink subframe. The above-mentioned relationship may follow the rule (i.e., symmetric DL/UL configuration) of backhaul UL subframe allocation.

A-SRS may be triggered by DCI format 0 (1 bit (UE-specific parameter) or DCI format 4 (2 bits)). In addition, the relay node (RN) may obtain information regarding parameters needed for aperiodic SRS transmission through RRC signaling. SRS configuration parameters may include srs-BandwidthConfiguration parameter, srsSubframeConfiguration parameter, srsBandwidth parameter, frequencyDomainPosition parameter, SrsHoppingBandwidth parameter, duration parameter, srsConfigurationIndex parameter, and transmissionComb parameter.

Thereafter, if a dynamic A-SRS (aperiodic-SRS) trigger is detected at a backhaul downlink subframe (n), A-SRS is transmitted at a first UE-specific A-SRS subframe (n') satisfying (n'≥n+4). However, the UE-specific A-SRS subframe (n') may not be a backhaul uplink subframe. For example, although the subframe is set to a backhaul downlink subframe by backhaul DL subframe configuration information, the subframes having indexes (#0, #4, #5, #9) in the FDD system or the subframes having indexes (#0, #1, #5, #6) in the TDD system may be used for an access link. That is, the subframes having indexes (#0, #4, #5, #9) in the FDD system and the subframes having indexes (#0, #1, #5, #6) in the TDD system may not be used in the backhaul link. Although the following description is disclosed on the basis of the FDD system for convenience of description and better understanding of the present invention, it is apparent to those skilled in the art that the following may also be applied to the TDD system without departing from the scope or spirit of the present invention.

The BS triggers aperiodic SRS transmission to the RN through either DCI format 0 (1 bit) or DCI format 4 (2 bits) so that it can perform A-SRS transmission. However, aperiodic SRS (A-SRS) transmission may use associated resources through higher layer signaling.

Under the above-mentioned situation, the present invention proposes two schemes for supporting efficient aperiodic sounding reference signal (SRS) transmission of the RN.

In aperiodic SRS (A-SRS) transmission, the case in which dynamic A-SRS trigger is detected at a backhaul downlink subframe #n is classified into one exemplary case in which a first UE-specific A-SRS subframe (n') is a backhaul UL subframe and the other exemplary case in which the first UE-specific A-SRS subframe (n') is not identical to the backhaul UL subframe.

Figure 9:
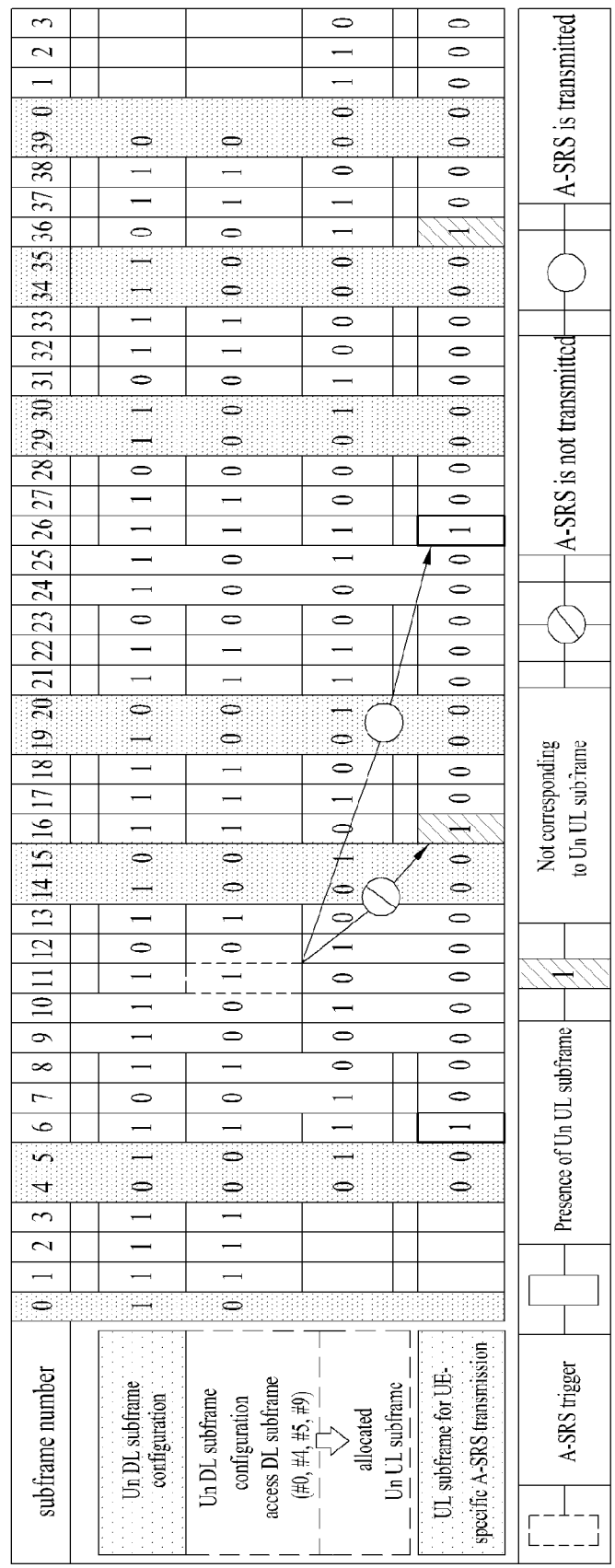
FIG. 9 is a conceptual diagram illustrating a method for establishing an uplink subframe to transmit a sounding reference signal (SRS) according to another embodiment of the present invention.

In accordance with a first scheme, as shown in FIGS. 8 and 9, if the UE-specific A-SRS subframe (n') is a backhaul UL subframe, A-SRS is transmitted at the subframe (n'). However, if the UE-specific SRS subframe (n') is not identical to the backhaul UL subframe, A-SRS is transmitted at the closest UL subframe that simultaneously satisfies a backhaul UL subframe and a UL-specific A-SRS subframe after lapse of the UE-specific A-SRS subframe (n').

FIG. 8 shows one embodiment for use in the FDD system. In FIG. 8, backhaul DL subframe configuration information for use in [Un DL SF configuration] region is denoted by "0 1 1 0 0 1 1 0", and the periodicity and offset of the UE-specific aperiodic SRS subframe are set to 10 ms and 5, respectively. The offset value for use in a resource configuration for A-SRS transmission is used to indicate a relative position with respect to a system frame boundary of a subframe capable of enabling A-SRS transmission. A period value may represent configuration of subframes capable of being used by a specific UE for A-SRS transmission. In FIG. 8, backhaul DL subframe configuration information is 8 bits long (i.e., 0 1 1 0 0 1 1 0), the number of subframe number (i.e., SF number) ranges from 0 to 7 or from 8 to 15 in such a manner that backhaul DL subframe configuration information (8 bits) is repeated five times within the range of 40 ms in step 801. That is, after completion of the above step, 40-bit backhaul DL subframe bitmap configuration information denoted by [Un DL SF configuration] is "0 1 1 0 0 1 1 0 0 1 1 0 0 1 1 0 0 1 1 0 0 1 1 0 0 1 1 0 0 1 1 0 0 1 1 0 0 1 1 0".

Thereafter, [Un DL SF configuration−Uu DL SF] indicates a bitmap of the remaining backhaul downlink (Un DL) subframes by removing [Uu DL SF] (#0, #4, #5, #9) from a bitmap of 40 bits after Un DL SF configuration information of 8 bits has been repeated five times. In this case, [Un DL SF] shows a subframe having indexes (#0, #4, #5, #9). That is, as shown in FIG. 8, the result of [Un DL SF configuration−Uu DL SF] is denoted by "0 1 1 0 0 0 1 0 0 0 0 0 0 1 0 0 0 1 1 0 0 1 1 0 0 0 1 0 0 0 0 0 0 1 0 0 0 1 1 0". As described above, the access DL subframe is constructed at the subframe #0, #4, #5, or #9. In addition, [Allocated Un UL SF] shows a bitmap of a backhaul (Un) UL subframe generated when the UL grant is transmitted in Un DL subframes of [Un DL SF configuration−Uu DL SF (#0, #4, #5, #9)]. Therefore, the Un UL subframe is decided on the basis of Un DL subframe configuration information and access DL subframe configuration information. As can be seen from the above-mentioned symmetric DL/UL configuration, the Un UL subframe is allocated to be delayed from the corresponding Un DL subframe by four subframes when the UL grant is transmitted within a valid Un DL subframe, so that [Allocated Un UL SF] shows that an index value of the subframe is allocated from the subframe #4 as shown in FIG. 8 in step 803.

In addition, [UL SF for UE-specific A-SRS Transmission] may be an uplink subframe for UE-specific A-SRS transmission, and may be defined as the periodicity and offset value. In FIG. 8, the periodicity and the offset in UL subframe configuration for UE-specific A-SRS transmission are set to 10 ms and 5, respectively. For example, in FIG. 8, [UL SF for UE-specific A-SRS Transmission] starting from the subframe #4 is denoted by "0 1 0 0 0 0 0 0 0 0 1 0 0 0 0 0 0 0 0 0 1 0 0 0 0 0 0 0 0 0 1 0 0 0 0 0 0 0 0 0" in step 804.

In more detail, when dynamic A-SRS trigger is detected at a Un DL subframe #6, the RN has to transmit A-SRS at the UL subframe #15 according to the UE-specific A-SRS transmission rule. However, since the UL subframe #15 is not set to the Un UL subframe, A-SRS is transmitted at the closest UL subframe #25 that simultaneously satisfies a UL subframe for UE-specific A-SRS transmission and a backhaul UL subframe after lapse of the UL subframe #15. In brief, the RN may transmit A-SRS only in a UL subframe that simultaneously satisfies [UL SF for UE-specific A-SRS transmission] and the Un UL subframe. In the embodiment of FIG. 8, the closest UL subframe that simultaneously satisfies the above-mentioned conditions after lapse of the UL subframe #15 is a UL subframe #25.

FIG. 9 shows another embodiment for use in the FDD system. Differently from FIG. 8, the periodicity of a UE-specific A-SRS subframe is maintained at 10 ms, and the offset value is set to 6.

Un DL subframe configuration is denoted by "1 1 1 1 0 1 1 0", and the periodicity and offset of a UE-specific A-SRS subframe are set to 10 ms and 6, respectively. In more detail, when dynamic A-SRS trigger is detected at the UN DL subframe #11, the RN has to transmit A-SRS at the UL subframe #16 according to the A-SRS transmission rule. However, since the UL subframe #16 is not set to the Un UL subframe, A-SRS is transmitted at the Un UL subframe #26 acting as a UL subframe for UE-specific A-SRS transmission after lapse of the UL subframe #16.

Figure 10:
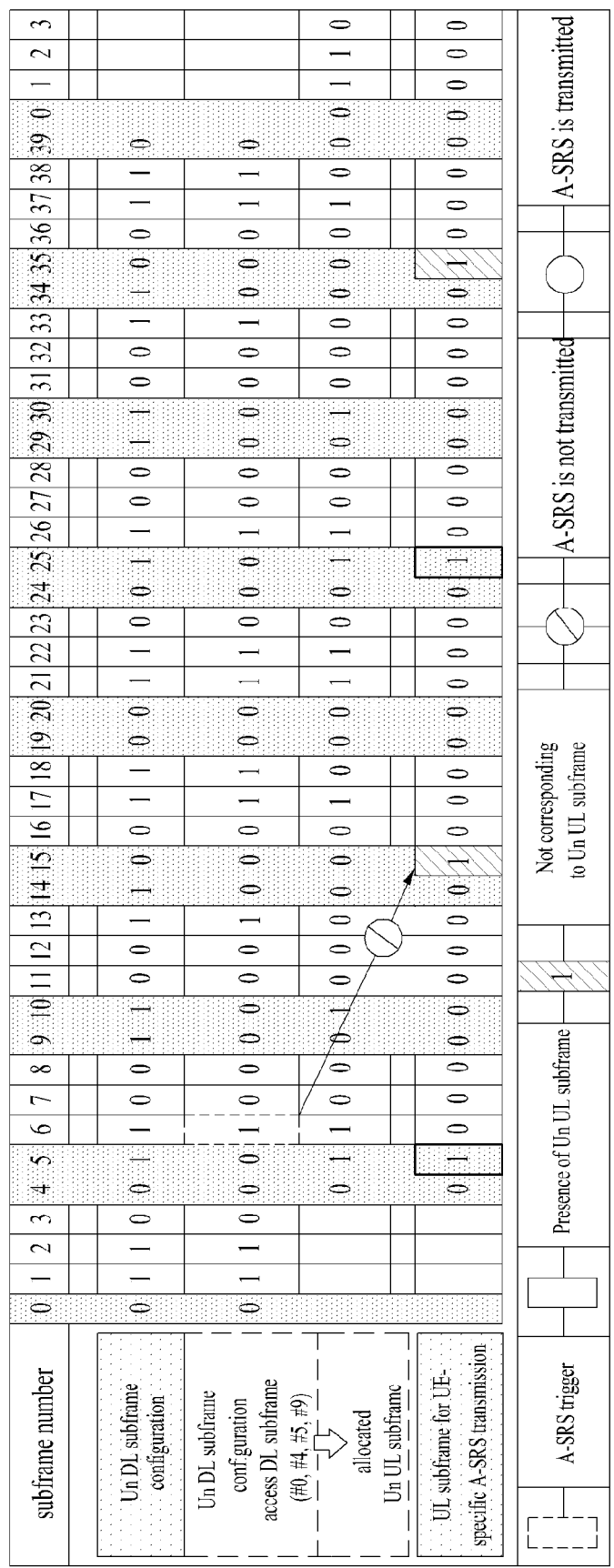
FIG. 10 is a conceptual diagram illustrating a method for establishing an uplink subframe to transmit a sounding reference signal (SRS) according to another embodiment of the present invention.
Figure 11:
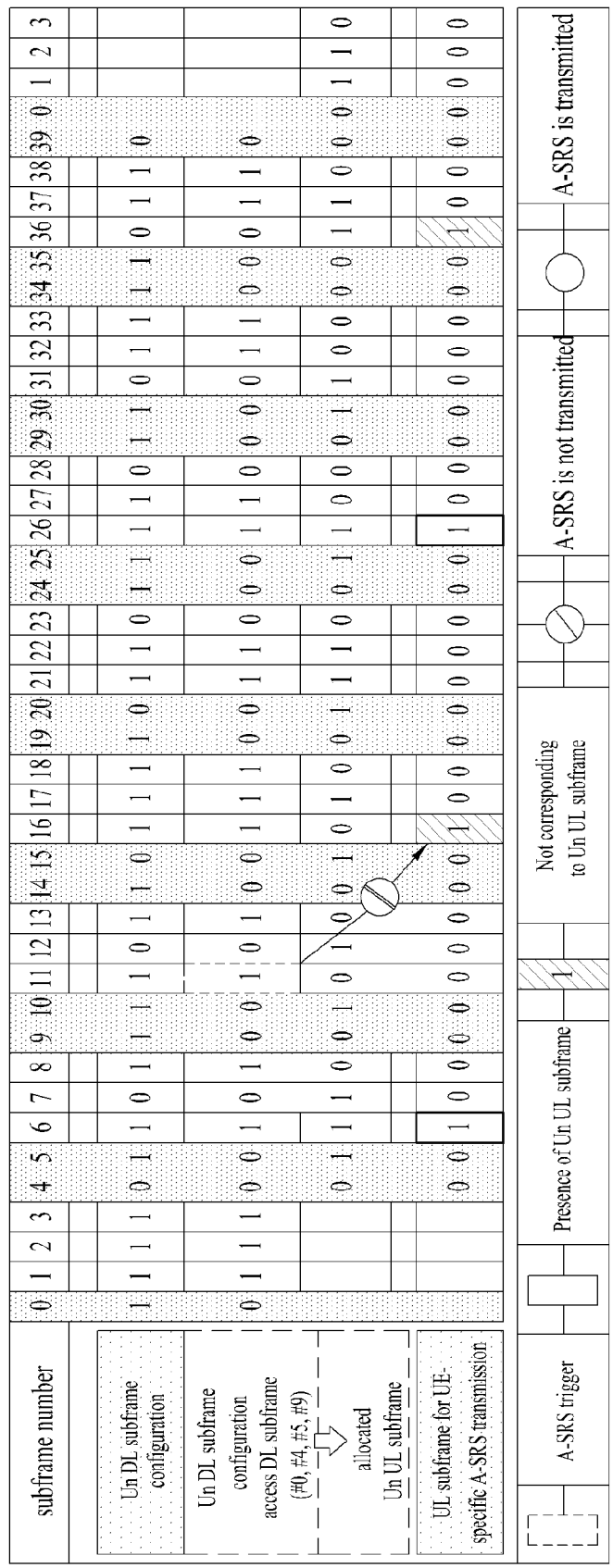
FIG. 11 is a conceptual diagram illustrating a method for establishing an uplink subframe to transmit a sounding reference signal (SRS) according to still another embodiment of the present invention.

In accordance with a second scheme, the one case in which dynamic A-SRS trigger is detected at the Un DL subframe #n during A-SRS transmission is divided into one exemplary case in which a first UE-specific A-SRS subframe (n') satisfying (n'≥n+4) is a Un UL subframe and the other exemplary case in which the first UE-specific A-SRS subframe (n') is not identical to the Un UL subframe. As shown in FIGS. 10 and 11, if a UE-specific A-SRS subframe (n') is used as a Un UL subframe, A-SRS is transmitted at the subframe (n'), and if the UE-specific A-SRS subframe (n') is not used as a Un UL subframe, an A-SRS signal is dropped. For example, one dropping method is configured not to transmit the A-SRS signal.

In FIG. 10, the Un DL subframe configuration for use in the FDD system is set to "0 1 1 0 0 1 1 0" in the same manner as in the Un DL subframe configuration of FIG. 8, and the periodicity and offset of the UE-specific A-SRS subframe for use in the FDD system are set to 10 ms and 5, respectively. Differently from FIG. 8, if the dynamic A-SRS trigger is detected at the Un DL subframe #6, the RN has to transmit A-SRS at the UL subframe #15 according to the A-SRS transmission rule. In contrast, assuming that the UL subframe #15 is not identical to the Un UL subframe, A-SRS is dropped. That is, according to one example of such dropping, the A-SRS signal may not be transmitted.

In FIG. 11, the Un DL subframe configuration for use in the FDD system is set to "1 1 1 1 0 1 1 0" in the same manner as in the Un DL subframe configuration of FIG. 9, and the periodicity and offset of the UE-specific A-SRS subframe for use in the FDD system are set to 10 ms and 6, respectively. Differently from FIG. 9, if the dynamic A-SRS trigger is detected at the Un DL subframe #11, the RN has to transmit A-SRS at the UL subframe #16 according to the A-SRS transmission rule. In contrast, assuming that the UL subframe #16 is not identical to the Un UL subframe, A-SRS is dropped. That is, according to one example of such dropping, the A-SRS signal may not be transmitted.

That is, as can be seen from the A-SRS transmission schemes shown in FIGS. 8, 9, 10, and 11, assuming that the dynamic A-SRS trigger is detected at the Un DL subframe #n, if a first UE-specific A-SRS subframe (n') satisfying (n'≥n+4) is not identical to the Un UL subframe, embodiments of the present invention are diversified according to whether A-SRS will be transmitted or dropped at the closest UL subframe configured to simultaneously satisfy the Un UL subframe and the UE-specific A-SRS subframe.

The purpose of A-SRS introduced into the 3GPP LTE Release 10 system is to improve channel estimation quality of the BS as well as to reduce overhead of periodic SRS transmission, and is to more accurately and adaptively perform channel estimation. Therefore, in the case of A-SRS transmission, assuming that the dynamic A-SRS trigger is detected at the Un DL subframe #n, if a first UE-specific A-SRS subframe (n') satisfying (n'≥n+4) is not identical to the Un UL subframe, it is more preferable that a sounding reference signal (SRS) be transmitted at the closest UL subframe that simultaneously satisfies the Un UL subframe and the UE-specific A-SRS subframe after lapse of the UE-specific A-SRS subframe (n') disclosed in the first embodiment than the second embodiment disclosing the dropping case. However, although the A-SRS is transmitted at the closest UL subframe satisfying the Un UL subframe and the UE-specific A-SRS subframe after lapse of the UE-specific A-SRS subframe (n'), a method for configuring power-related parameters related to A-SRS transmission may cause unexpected problems.

In accordance with a first embodiment of the present invention, assuming that the A-SRS is transmitted at the closest subframe that simultaneously satisfies the Un UL subframe and the UE-specific A-SRS subframe after lapse of the UE-specific SRS subframe (n'), it may be possible to consider a method for using and transmitting A-SRS transmission power parameters at the UE-specific SRS subframe (n') at which A-SRS should be basically transmitted. For example, assuming that the UL subframe #15 for UE-specific A-SRS transmission is not identical to the Un UL subframe as shown in FIG. 8, A-SRS transmission power parameters are used at the Un UL subframe #15 without change, such that the A-SRS may be transmitted at the subframe #25.

In the following A-SRS transmission, assuming that the dynamic A-SRS trigger is detected at the Un DL subframe #n and a first UE-specific A-SS subframe (n') satisfying (n'≥n+4) is not identical to the Un UL subframe, the closest UL subframe that simultaneously satisfies the Un UL subframe and the UE-specific A-SRS subframe after lapse of the UE-specific A-SRS subframe (n') is defined as 'SRS Subframe Type 2', and a first UE-specific A-SRS subframe (n') satisfying (n'≥n+4) is defined as 'SRS Subframe Type 1'.

Differently from a method for always using configuration values of A-SRS transmission power parameters of SRS Subframe Type 2, A-SRS transmission for use in the above SRS Subframe Type 2 proposes a method for efficiently configuring A-SRS transmission power parameters in SRS Subframe Type 2 on the condition that PUSCH or A-SRS transmission is achieved between SRS Subframe Type 1 and SRS Subframe Type 2.

That is, according to one embodiment, assuming that a first UE-specific A-SRS subframe satisfying (n'≥n+4) is not identical to the Un UL subframe and A-SRS transmission is achieved at SRS Subframe Type 2 acting as the closest UL subframe that simultaneously satisfies the Un UL subframe and the UE-specific A-SRS subframe after lapse of the UE-specific A-SRS subframe (n'), some power parameter configurations of PUSCH or A-SRS transmission generated between SRS Subframe Type 1 and SRS Subframe Type 2 may be used for A-SRS transmission power configuration, such that it can efficiently cope with a variation in a UL channel state.

However, assuming that PUSCH or A-SRS transmission is not present between SRS Subframe Type 1 and SRS Subframe Type 2, A-SRS transmission in SRS Subframe Type 2 may follow configuration values of A-SRS transmission power parameters of SRS Subframe Type 1. For example, in association with A-SRS transmission power configurations in Subframe Type 2 shown in FIG. 2, assuming that PUSCH or A-SRS transmission is not present between the subframe #15 and the subframe #25 that are placed between SRS Subframe Type 1 and SRS Subframe Type 2, this result may follow A-SRS transmission power parameter configuration values at the subframe #15 corresponding to SRS Subframe Type 1.

In association with each SRS power parameter configuration for A-SRS transmission, parameters used for PUSCH transmission power configuration may be used according to a first embodiment, or a method for transmitting A-SRS using parameters used for periodic SRS transmission power configuration instead of using the A-SRS may be used according to a second embodiment.

In accordance with a second embodiment, a method for transmitting the A-SRS using parameters used for periodic SRS transmission power configuration instead of using the A-SRS may be used. For example, if PUSCH transmission is achieved between the subframe #15 and the subframe #25 as shown in FIG. 8, A-SRS may be transmitted at the subframe #25 using the latest updated PUSCH-based power parameters. In addition, assuming that periodic SRS transmission is achieved between the subframe #15 and the subframe #25, A-SRS may be transmitted at the subframe #25 using the periodic SRS-based power parameters. However, assuming that PUSCH or periodic SRS transmission is not present between the subframe #15 for SRS Subframe Type 1 and the subframe #25 for SRS Subframe Type 2 in FIG. 8, A-SRS transmission power parameter configuration values at the subframe #15 corresponding to SRS Subframe Type 1 may be used.

The power control equation for SRS transmission can be represented by the following Equation 2.

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\}$$ [Equation 2]

In Equation 2, (i) is a subframe index, and $P_{SRS,c}(i)$ is SRS power transmitted at the subframe (i) [where, a subframe of the index (i)]. In Equation 2, the SRS power $P_{SRS,c}(i)$ includes parameters that are semi-statically decided by the BS through higher layer signaling and then applied to the UE, and other parameters that are dynamically decided through a Transmit Power Control (TPC) command of a PDCCH.

The BS informs the UE of $P_{SRS\_OFFSET,c}(m)$, $M_{SRS,c}$, $P_{O\_PUSCH,c}(j)$, and $\alpha_c(j)$ through higher layer signaling. The BS may dynamically inform the UE of $f_c(i)$ through a TPC command of a PDCCH. $P_{SRS\_OFFSET,c}(m)$ is a UE-specific parameter (e.g., 4 bits) acting as a power offset for SRS transmission, is semi-statically configured by a higher layer, and is then signaled from the BS to the UE. $f_c(i)$ is a specific value indicating a current PUSCH power control state, and may be represented by a current absolute value or accumulated value. $\alpha_c(j)$ is a cell-specific parameter that is transmitted by the BS using 3 bits through higher layer signaling. If j is set to 0 or 1 (j=0 or j=1), $\alpha_c \in \{0, 0.4, 0.5, 0.6, 0.7, 0.8, 0.9, 1\}$. If j=2, $\alpha_c(j)$ is set to 1 ($\alpha_c(j)$=1). $\alpha_c(j)$ is signaled from the BS to the UE.

$P_{CMAX,c}(i)$ denotes a UE transmission power, $M_{SRS,c}$ denotes an SRS transmission bandwidth at the subframe (i) denoted by the number of resource blocks (RBs), and $P_{O\_PUSCH,c}(j)$ denotes a parameter composed of the sum of a cell-specific nominal component received from a higher layer and a UE-specific component $P_{O\_UE\_PUSCH,c}(j)$ received from a higher layer. $P_{CMAX,c}(i)$, $M_{SRS,c}$, and $P_{O\_PUSCH,c}(j)$ are signaled from the BS to the UE.

$PL_c$ is a DL pathloss (or signal loss) estimation value that is calculated by the UE in units of dB. $PL_c$ is denoted by referenceSignalPower–higher layer filteredRSRP ($PL_c$=referenceSignalPower–higher layer filteredRSRP). The BS may classify SRS transmission into periodic SRS transmission and aperiodic SRS (A-SRS) transmission, such that it may inform the UE of $P_{SRS\_OFFSET,c}(m)$. For example, Trigger Type 0 (trigger type 0) means "m=0", the BS may inform the UE of the power offset value for periodic SRS transmission through higher layer signaling. In addition, Trigger Type 1 means "m=1", the BS may inform the UE of the power offset value for A-SRS transmission through higher layer signaling.

In accordance with one embodiment, as shown in FIG. 9, assuming that A-SRS is not transmitted at the UL subframe #16 and is transmitted at the subframe #26, that serves as both a UL subframe for UE-specific A-SRS transmission and a backhaul UL subframe, after lapse of the UL subframe #16, the A-SRS transmission power may be established (i) on the basis of the closest PUSCH power parameter before the subframe #26; and may also be established (ii) on the basis of the closest SRS power parameter before the subframe #26.

First, in association with a method for configuring A-SRS transmission power in SRS Subframe Type 2, parameters of Equation 2 may be established in different ways according to the closest PUSCH power parameters.

If PUSCH transmission is present between SRS Subframe Type 1 and SRS Subframe Type 2, updated parameters $[P_{O\_PUSCH,c}(j), PL_c, \alpha_c(j), f_c(i)]$ are applied to A-SRS transmission power parameters in SRS Subframe Type 2, and $P_{SRS\_OFFSET,c}(m)$ and $M_{SRS,c}$ may maintain A-SRS parameter configuration in SRS Subframe Type 1 without change. In addition, the latest updated parameters ($P_{O\_PUSCH,c}(j)$, $PL_c$, $\alpha_c(j)$, $f_c(i)$, $P_{SRS\_OFFSET,c}(m)$) are applied thereto, and $M_{SRS,c}$ may maintain A-SRS parameter configuration in SRS Subframe Type 1 without change. However, assuming that PUSCH transmission is not present between SRS Subframe Type 1 and SRS Subframe Type 2, power parameters for A-SRS transmission in SRS Subframe Type 2 may follow A-SRS power parameter configuration in SRS Subframe Type 1. In contrast, assuming that periodic SRS transmission is present between SRS Subframe Type 1 and SRS Subframe Type 2, the latest updated parameters ($P_{O\_PUSCH,c}(j)$, $PL_c$, $\alpha_c(j)$, $f_c(i)$) are applied by periodic SRS transmission located closest to SRS Subframe Type 2, and $P_{SRS\_OFFSET,c}(m)$ and $M_{SRS,c}$ may maintain A-SRS parameter configuration in SRS Subframe Type 1 without change. Alternatively, the latest updated parameters ($P_{O\_PUSCH,c}(j)$, $PL_c$, $\alpha_c(j)$, $f_c(i)$, $P_{SRS\_OFFSET,c}(m)$) are applied thereto, and $M_{SRS,c}$ may maintain A-SRS parameter configuration in SRS Subframe Type 1 without change.

Second, in association with a method for configuring A-SRS transmission power in SRS Subframe Type 2, parameters of Equation 2 may be established in different ways according to the closest periodic SRS power parameters. For example, the latest updated periodic SRS parameters ($P_{O\_PUSCH,c}(j)$, $PL_c$, $\alpha_c(j)$, $f_c(i)$) may be used as power parameters for A-SRS transmission for use in SRS Subframe Type 2, $P_{SRS\_OFFSET,c}(m)$ and $M_{SRS,c}$ may maintain A-SRS parameter configuration in SRS Subframe Type 1 without change. In addition, the latest updated periodic SRS parameters ($P_{O\_PUSCH,c}(j)$, $PL_c$, $\alpha_c(j)$, $f_c(i)$) and the latest updated parameter $P_{SRS\_OFFSET,c}(m)$ may be used without change, and $M_{SRS,c}$ may maintain A-SRS parameter configuration in SRS Subframe Type 1 without any change. As shown in FIG. 9, assuming that periodic SRS transmission is not present between the subframe #16 and the subframe #26, power parameters for A-SRS transmission in SRS Subframe Type 2 may follow A-SRS power parameter configuration at the subframe #16 for SRS Subframe Type 1. In contrast, assuming that PUSCH transmission is present between the subframe #16 and the subframe #26, the latest updated parameters ($P_{O\_PUSCH,c}(j)$, $PL_c$, $\alpha_c(j)$, $f_c(i)$) are applied by PUSCH transmission located closest to the subframe #26, and $P_{SRS\_OFFSET,c}(m)$ and $M_{SRS,c}$ may maintain A-SRS parameter configuration in SRS Subframe Type 1 without any change. Alternatively, the latest updated parameters ($P_{O\_PUSCH,c}(j)$, $PL_c$, $\alpha_c(j)$, $f_c(i)$, $P_{SRS\_OFFSET,c}(m)$) are applied thereto, and $M_{SRS,c}$ may maintain A-SRS parameter configuration in SRS Subframe Type 1.

In association with A-SRS transmission power configuration in SRS Subframe Type 2, the BS may inform the relay node (RN) of an indication bit through either a specific field or higher layer signaling. Here, the indication bit may also inform the relay node (RN) of at least one of a method for applying a power parameter used for periodic SRS transmission, a method for applying a power parameter used for PUSCH transmission, or a method for applying a power parameter for A-SRS transmission in SRS Subframe Type 1 corresponding to a subframe at which A-SRS should be basically transmitted. Alternatively, a method for configuring each parameter for A-SRS transmission power at the subframe #26 for use in SRS Subframe Type 2 as shown in FIG. 9 may be directly indicated through either a new format PDCCH field or higher layer signaling.

In accordance with another embodiment, assuming that the dynamic A-SRS trigger is detected at the Un DL subframe #n and a first UE-specific A-SRS subframe (n') satisfying (n'≥n+4) is not identical to the Un UL subframe, if A-SRS is transmitted at the closest UL subframe that simultaneously satisfies the Un UL subframe and the UE-specific A-SRS subframe after lapse of the UE-specific A-SRS subframe (n'), a predetermined frequency hopping pattern for the above usages may be used as necessary.

The BS may inform the relay node (RN) of a specific frequency hopping pattern rule for each SRS bandwidth category through a higher layer signal or a physical DL channel. Here, the specific frequency hopping pattern rule is used only when A-SRS transmission is used in SRS Subframe Type 2. That is, the RN transmits A-SRS to which a specific frequency hopping pattern is applied to the BS in SRS Subframe Type 2, such that it may obtain a diversity gain or the like in light of a frequency domain. In case of A-SRS transmission in SRS Subframe Type 2, since an UL channel state of SRS Subframe Type 2 may be changed as compared to the case of the SRS Subframe Type 1, the UL channel state may efficiently cope with a UL channel state variation. For example, as can be seen from FIG. 9, the RN may transmit A-SRS using a specific-pattern frequency hopping corresponding to an A-SRS transmission bandwidth at the subframe #26 for SRS Subframe Type 2.

A method for configuring transmissionComb, $n^{cs}_{SRS}$ (Cyclic Shift), and srsBandwidth parameters of A-SRS transmitted in SRS Subframe Type 2 may use the transmissionComb, $n^{cs}_{SRS}$ (Cyclic Shift), and srsBandwidth parameters of the periodic SRS transmitted between SRS Subframe Type 1 and SRS Subframe Type 2. For example, assuming that the periodic SRS is transmitted between the UE-specific UL subframe #15 and the UE-specific UL subframe #25 in FIG. 8, A-SRS transmission at the subframe #25 for SRS Subframe Type 2 may use the transmissionComb, $n^{cs}_{SRS}$ (Cyclic Shift), and srsBandwidth parameters for use in transmission of the periodic reference signal (RS).

In accordance with another embodiment of the present invention, the BS may separately inform the RN of resource information for A-SRS transmission in SRS Subframe Type 2 through a specific field of a legacy PDCCH, a new format PDCCH field, or a higher layer signaling. As described above, the BS may separately inform the RN of resource information for A-SRS transmission in SRS Subframe Type 2, such that the BS can efficiently control and multiplex transmission of a plurality of A-SRSs transmitted from the RNs at a time point of SRS Subframe Type 2. When the BS separately informs the RN of resource information for A-SRS transmitted in SRS Subframe Type 2, the resource may correspond to a total band or a partial band in light of a frequency aspect. In addition, when the BS separately informs the RN of resource information for A-SRS transmitted in SRS Subframe Type 2, the method and apparatus according to the present invention may inform the RN of information regarding a plurality of A-SRS resources, and the BS may also inform the RN of A-SRS resources appropriate for a current UL channel state through any one of a legacy PDCCH field, a new format PDCCH field, or higher layer signaling.

Figure 12:
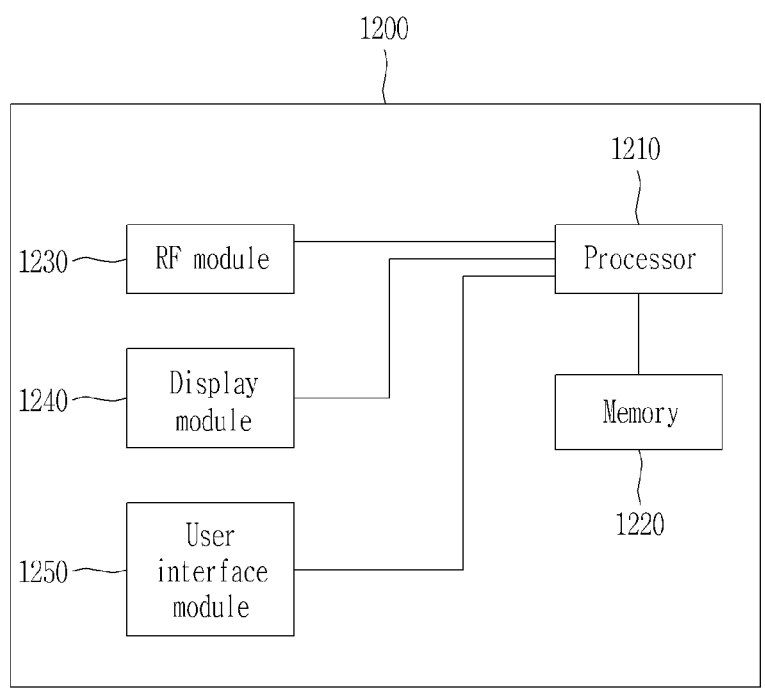
FIG. 12 is a block diagram illustrating a communication device according to one embodiment of the present invention.

FIG. 12 is a block diagram illustrating a communication device according to one embodiment of the present invention.

Referring to FIG. 12, a communication device 1200 includes a processor 1210, a memory 1220, an RF module 1230, a display module 1240, and a user interface module 1250.

The communication device 1200 is illustrated for convenience of the description and some modules can be omitted. Moreover, the communication device 1200 may further include necessary modules. Some modules of the communication device 1200 may be further divided into sub-modules. The processor 1210 is configured to perform operations according to the embodiment of the present invention exemplarily described with reference to the accompanying drawings. In particular, for the detailed operations of the processor 1210, reference may be made to the contents described with reference to FIGS. 1 to 9.

The memory 1220 is connected to the processor 1210 and stores an operating system, applications, program code, data, and the like. The RF module 1230 is connected to the processor 1210 and performs a function of converting a baseband signal into a radio frequency (RF) signal or converting a radio frequency (RF) signal into a baseband signal. For this, the RF module 1230 performs analog conversion, amplification, filtering, and frequency upconversion or inverse processes thereof. The display module 1240 is connected to the processor 1210 and displays various types of information. The display module 1240 may include, but is not limited to, a well-known element such as a Liquid Crystal Display (LCD), a Light Emitting Diode (LED), or an Organic Light Emitting Diode (OLED). The user interface module 1250 is connected to the processor 1210 and may include a combination of well-known interfaces such as a keypad and a touchscreen.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that the present invention can be embodied in other specific forms without departing from the spirit and essential characteristics of the

The invention claimed is:

1. A method for transmitting an aperiodic sounding reference signal (A-SRS) to a base station (BS) by a relay node (RN) in a wireless communication system comprising:
   receiving backhaul downlink (DL) subframe configuration information from the base station (BS);
   allocating backhaul uplink (UL) subframes on the basis of the backhaul DL subframe configuration information;
   receiving configuration information of UL subframes for A-SRS transmission from the BS;
   receiving an indicator for triggering the A-SRS transmission from the base station (BS); and
   if a first UL subframe among the UL subframes for the A-SRS transmission is allocated as the backhaul UL subframe, transmitting the A-SRS to the BS in the first UL subframe,
   wherein, if the first UL subframe is not allocated as the backhaul UL subframe, the A-SRS is transmitted to the BS at a second UL subframe among the UL subframes for the A-SRS transmission,
   wherein the second UL subframe is the closest UL subframe for the A-SRS transmission after the first UL subframe and is allocated as the backhaul UL subframe, and
   wherein:
   transmission power of the A-SRS transmitted in the second UL subframe is determined by power parameters for the A-SRS transmission configured for the first UL subframe if an uplink data channel is not transmitted between the first UL subframe and the second UL subframe, and
   the transmission power of the A-SRS transmitted in the second UL subframe is determined by the power parameters for the uplink data channel if the uplink data channel is transmitted between the first UL subframe and the second UL subframe.

2. The method according to claim 1, wherein allocating the backhaul UL subframes comprises:
   excluding access DL subframes from backhaul DL subframes designated by the backhaul DL subframe configuration information; and
   delaying the backhaul DL subframes by four subframes.

3. The method according to claim 2, wherein the access DL subframes are subframes having indices #0, #4, #5, and #9.

4. The method according to claim 1, wherein the configuration information of the UL subframes for the A-SRS transmission includes an offset value and a periodicity for transmission of the A-SRS.

5. The method according to claim 1, wherein the A-SRS is transmitted using a predetermined hopping pattern in the second UL subframe regardless of a hopping pattern configured for the first UL subframe.

6. A relay node (RN) for transmitting an aperiodic sounding reference signal (A-SRS) in a wireless communication system comprising:
   a reception module configured to receive backhaul downlink (DL) subframe configuration information from a base station (BS), to receive configuration information of UL subframes for A-SRS transmission from the BS, and to receive an indicator for triggering the A-SRS transmission from the BS;
   a processor configured to allocate backhaul uplink (UL) subframes on the basis of the backhaul DL subframe configuration information; and
   a transmission module configured to transmit the A-SRS to the BS in the first UL subframe if a first UL subframe among the UL subframes for the A-SRS transmission is allocated as the backhaul UL subframe,
   wherein the transmission module is further configured to transmit the A-SRS to the BS at a second UL subframe among the UL subframes for the A-SRS transmission if the first UL subframe is not allocated as the backhaul UL subframe,
   wherein the second UL subframe is the closest UL subframe for the A-SRS transmission after the first UL subframe and is allocated as the backhaul UL subframe, and
   wherein:
   transmission power of the A-SRS transmitted in the second UL subframe is determined by power parameters for the A-SRS transmission configured for the first UL subframe if an uplink data channel is not transmitted between the first UL subframe and the second UL subframe, and
   the transmission power of the A-SRS transmitted in the second UL subframe is determined by the power parameters for the uplink data channel if the uplink data channel is transmitted between the first UL subframe and the second UL subframe.

7. The relay node (RN) according to claim 6, wherein the processor is further configured to exclude access DL subframes from backhaul DL subframes designated by the backhaul DL subframe configuration information, and to allocate the backhaul UL subframes by delaying the backhaul DL subframes by four subframes.

8. The relay node (RN) according to claim 7, wherein the access DL subframes are subframes having indices #0, #4, #5, and #9.

9. The relay node (RN) according to claim 6, wherein the configuration information of the UL subframes for the A-SRS transmission includes an offset value and a periodicity for transmission of the A-SRS.

10. The relay node (RN) according to claim 6, wherein the A-SRS is transmitted using a predetermined hopping pattern in the second UL subframe regardless of a hopping pattern configured for the first UL subframe.

* * * * *